(12) United States Patent
Ford

(10) Patent No.: US 6,439,105 B1
(45) Date of Patent: Aug. 27, 2002

(54) MULTIPLE DIRECTION HOLDER AND BEVERAGE MAKING APPARATUS

(75) Inventor: David F. Ford, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 09/629,560

(22) Filed: Jul. 31, 2000

(51) Int. Cl.[7] ................................................ A47J 31/00
(52) U.S. Cl. ............................ 99/280; 99/285; 99/290; 99/284; 99/307; 99/323
(58) Field of Search ........................ 99/280, 284, 290, 99/291, 304, 305, 306, 307, 323, 285

(56) References Cited

U.S. PATENT DOCUMENTS

| | | | |
|---|---|---|---|
| 1,357,445 A | 11/1920 | Mattei | 99/291 |
| 3,608,471 A | 9/1971 | Martin | 99/283 |
| 4,064,795 A | 12/1977 | Ackerman | 99/304 |
| 4,207,809 A * | 6/1980 | Brill | 99/279 |
| 4,303,525 A * | 12/1981 | Stover | 99/306 X |
| 4,309,939 A | 1/1982 | Stover | 99/280 |
| 4,550,652 A | 11/1985 | Da Silva | 99/279 |
| 4,579,048 A | 4/1986 | Stover | 99/280 |
| 4,920,871 A | 5/1990 | Anson et al. | 99/295 |
| 5,025,714 A | 6/1991 | Brewer | 99/300 |
| 5,111,969 A | 5/1992 | Knepler | 222/54 |
| 5,113,752 A | 5/1992 | Brewer | 99/295 |
| 5,245,914 A | 9/1993 | Vitous | 99/280 |
| 5,287,797 A * | 2/1994 | Grykiewicz et al. | 99/295 |
| 5,309,819 A | 5/1994 | Ford | 99/28 |
| 5,460,078 A | 10/1995 | Weller et al. | 99/295 |
| 5,465,650 A | 11/1995 | Friedrich et al. | 99/286 |
| 5,511,465 A | 4/1996 | Friedrich et al. | 99/286 |
| 5,584,229 A | 12/1996 | Anson | 99/280 |
| 5,647,055 A | 7/1997 | Knepler | 392/451 |
| 5,855,162 A | 1/1999 | Bauer et al. | 99/290 |
| 5,913,965 A | 6/1999 | Gasser et al. | 99/293 |
| 5,943,944 A | 8/1999 | Lassota | 99/280 |
| 5,953,981 A | 9/1999 | Lassota | 99/281 |
| 5,970,848 A | 10/1999 | Pelech et al. | 99/291 |
| 5,992,300 A | 11/1999 | Fukushima | 99/302 R |
| 6,220,147 B1 | 4/2001 | Priley | 99/323 |

\* cited by examiner

Primary Examiner—Reginald L. Alexander
(74) Attorney, Agent, or Firm—Barnes & Thornburg

(57) ABSTRACT

A holder is used with a beverage making apparatus to make a beverage, such as coffee, concentrated beverage or tea. The holder retains a quantity of substance which can be used to make a beverage which is thereafter deposited into one of two reservoirs. This allows different flavors, or regular and decaffeinated coffee, to be served from the apparatus. The holder includes a body, a drain hole provided therethrough for allowing liquids to flow through the holder, and first and second handles attached to the body. The first handle and the second handle are offset from each other. A first magnet is associated with the first handle and has its north and south poles in first orientation. A second magnet is associated with the second handle and has its north and south poles in second orientation which is generally opposite the first orientation. The apparatus includes a housing on which the holder can be mounted in various directions. A sensor is provided on the housing to detect whether the first magnet or the second magnet is thereunder and to detect the orientation of the magnet thereunder. This information is sent to a controller on the apparatus and the controller determines which beverage is to be made and the presence or absence of the holder.

13 Claims, 3 Drawing Sheets

MULTIPLE DIRECTION HOLDER AND BEVERAGE MAKING APPARATUS

BACKGROUND OF THE INVENTION

This invention is generally directed to a holder for use in retaining a quantity of a substance and a beverage making apparatus which is used to make a beverage, such as coffee, concentrated beverage or tea. More particularly, the invention contemplates a holder which is used with a beverage making apparatus to make a beverage and to dispense the beverage into one of two reservoirs, to allow different flavors, or regular and decaffeinated coffee, to be served from the beverage making apparatus.

Prior art holders, such as a funnel, are formed from a body having a drain hole through a center of a bottom wall of the body. The liquid passes through the holder and through the drain hole to pass the beverage into a reservoir. As such, this type of holder can only service one reservoir.

The present invention provides a holder and a beverage making apparatus which can be used to make a beverage and deposit the beverage into one of two reservoirs, which would allow different flavors, or regular and decaffeinated coffee, to be served from the beverage making apparatus. Other features and advantages over the prior art will become clear upon a reading of the attached specification in combination with a study of the drawings.

OBJECTS AND SUMMARY OF THE INVENTION

A general object of the present invention is to provide an improved holder and beverage making apparatus which are used to make a beverage, such as coffee, concentrated beverage or tea.

Another general object of the present invention is to provide a holder and beverage making apparatus which are used to make a beverage and deposit the beverage into one of two reservoirs, thereby allowing different flavors, or regular and decaffeinated coffee, to be served from the beverage making apparatus.

Briefly, and in accordance with the foregoing, the present invention discloses a holder and beverage making apparatus for use in making a beverage, such as coffee, concentrated beverage or tea. The holder is mounted on the beverage making apparatus and can be used to make a beverage and deposit the beverage into one of two reservoirs, which would allow different flavors, or regular and decaffeinated coffee, to be served from the beverage making apparatus.

The holder includes a body, a drain hole provided therethrough for allowing liquids to flow through the holder, a first handle attached to the body and a second handle attached to the body. The first handle and the second handle are offset from each other. A first means is provided on the body for providing an indication of a first orientation of the body. A second means is provided on the body for providing an indication of a second orientation of the body. The first means and the second means are offset from each other. The first means may comprise a magnet which has its north and south poles in a first orientation, such as for example, its north pole in an upward direction and its south pole in a downward direction. The first means may be mounted on the handle or on the body. The second means may comprise a magnet which has its north and south poles in a second orientation, such as for example, its south pole in an upward direction and its north pole in a downward direction. The second means may be mounted on the handle or on the body.

The beverage making apparatus includes a housing on which the holder can be selectively mounted in one of two directions. A sensor is provided on the housing and senses whether the first means or the second means is within its sensing range. If magnets are used, the sensor senses which pole is within its sensing range. This information is sent to a controller on the beverage making apparatus. The controller determines which beverage is to be made and instructs the components of the beverage making apparatus to make the appropriate beverage.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
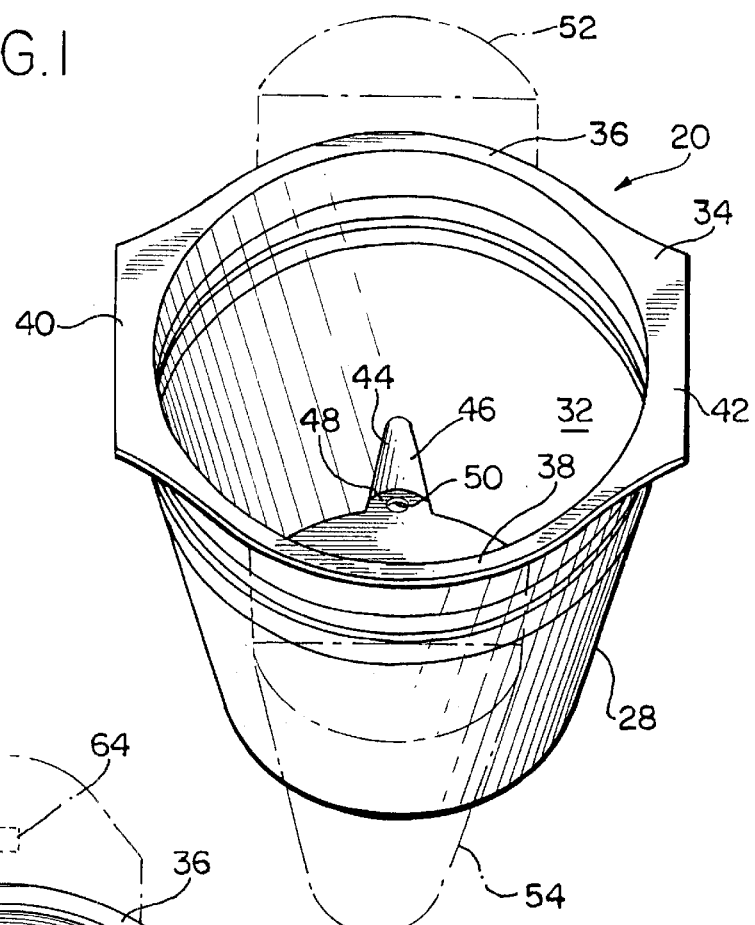
FIG. 1 is a perspective view of a holder, with a portion thereof being shown in phantom lines, which incorporates features of the invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a holder 20 and a beverage making apparatus 22 which are used to make a beverage, such as coffee, concentrated beverage or tea. The present invention has particular use in brewing a beverage, such as coffee, concentrated beverage or tea. The holder 20 holds a quantity of a substance and can be used to dispense the beverage into one of two reservoirs 24, 26, which would allow different flavors, or regular and decaffeinated coffee, to be served from the beverage making apparatus 22.

Figure 2:
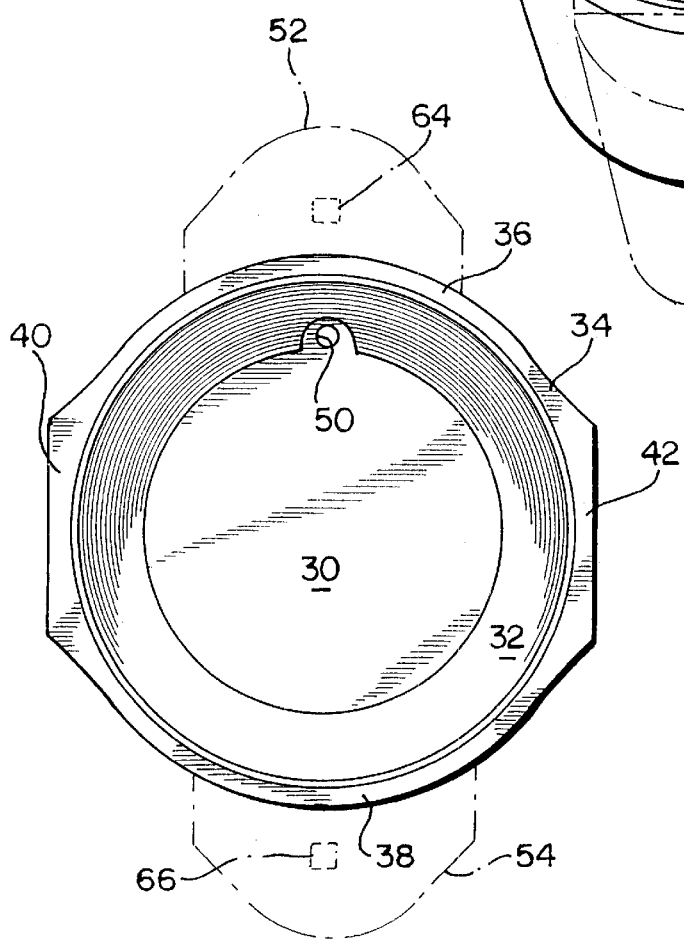
FIG. 2 is a top plan view of the holder of FIG. 1, with a portion thereof being shown in phantom lines.

Attention is first invited to FIGS. 1 and 2 which show the holder 20. The holder 20 is formed from a body 28 which includes a flat, generally circular bottom wall 30 and a generally truncated conical side wall 32 to form a cup-shaped and open-ended member. The body 28 is made of a suitable material that can withstand higher heat levels, is dishwasher safe and is food safe, such as stainless steel or a suitable plastic material.

A flange 34 is provided around the upper end of the side wall 32 and extends therefrom. As shown, the flange 34 generally extends outwardly from the side wall 32 although other configurations may be possible. The flange 34 has a first portion 36 and a second portion 38 which are opposite to each other and each has a generally curved outer edge, and a third portion 40 and a fourth portion 42 which are opposite to each other and each has a generally straight edge. The third and fourth portions 40, 42 properly align the holder 20 with the beverage making apparatus 22 when the holder 20 is attached thereto and prevent rotation of the holder 20 relative to the beverage making apparatus 22 when the holder 20 is attached thereto.

The body 28 includes a drain 44 therein which is proximate to the first portion 36 of the flange 34. The drain 44 is formed from a curved wall portion 46 which interrupts the truncated conical shape of the side wall 32. The curved wall portion 46 protrudes outwardly from the remainder of the side wall 32 and extends from the bottom wall 30 upwardly a predetermined distance. The curved wall portion 46 also causes an interruption in the circular shape of the bottom wall 30 such that a wall portion 48 fills in the bottom end of the curved wall portion 46.

A drain hole 50 is provided through the wall portion 48. As such, the drain hole 50 is offset from the center of the bottom wall 30 and is proximate to the first portion 36 of the flange 34. The drain hole 50 is positioned through the lower portion of the holder 20 to assure that all of the beverage drains from the holder 20 through the drain hole 50.

A first handle 52 and a second handle 54 are mounted on the body 28 by suitable means and at opposed positions. Each handle 52, 54 includes an upper portion 56, 58, respectively, which extends outwardly from the upper end of the side wall 32 of the body 28 and a gripping portion 60, 62, respectively, which extends downwardly and outwardly from the respective upper portion 56, 58. The first handle 52 is attached to the body 28 along the first portion 36 of the flange 34 by suitable means, such as fasteners, welding or integral molding. The second handle 54 is attached to the body 28 along the second portion 38 of the flange 34 by like suitable means.

A magnet 64 is associated with the first handle 52 and is oriented in a first orientation. For example, the magnet 64 can be orientated such that its north pole is in an upward direction and its south pole is in a downward direction. The magnet 64 may be mounted in the upper portion 56 of the first handle 52 as shown, may be mounted proximate to the first handle 52, such as in the first portion 36 of the flange 34, or in another suitable location on the body 28. A magnet 66 is associated with the second handle 54 and is oriented in a second orientation which is generally opposite the first orientation. For example, the magnet 66 can be orientated such that its south pole in an upward direction and its north pole in a downward direction. The magnet 66 may be mounted in the upper portion 58 of the second handle 54 as shown, may be mounted proximate to the second handle 54, such as in the second portion 38 of the flange 34, or in another suitable location on the body 28 so long as the magnets 64, 66 are spaced apart from each other on the body 28.

Figure 3:
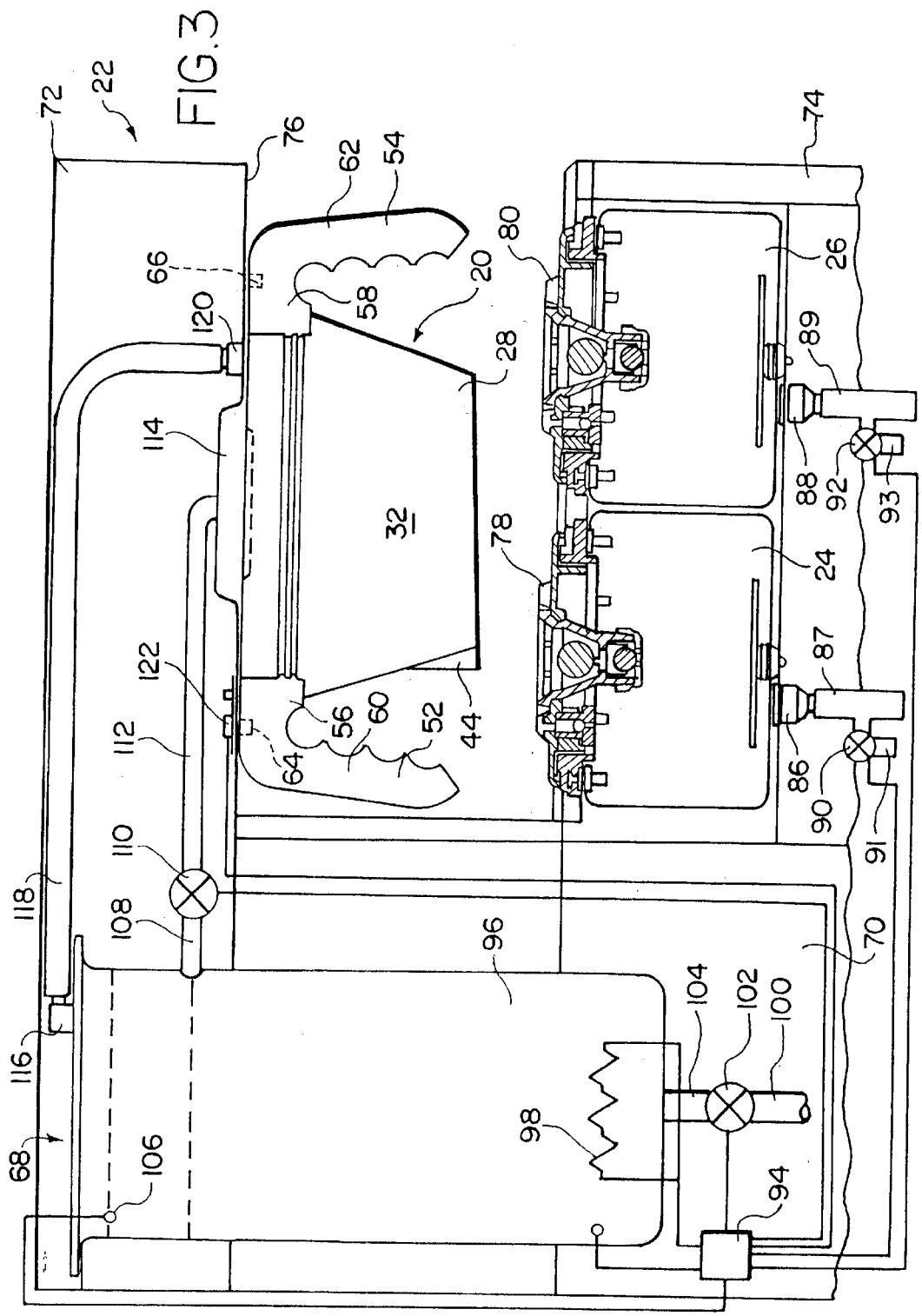
FIG. 3 is a cross-sectional view of a beverage making apparatus which incorporates the features of the invention upon which the holder is mounted in a first direction, such holder being shown in side elevation.
Figure 4:
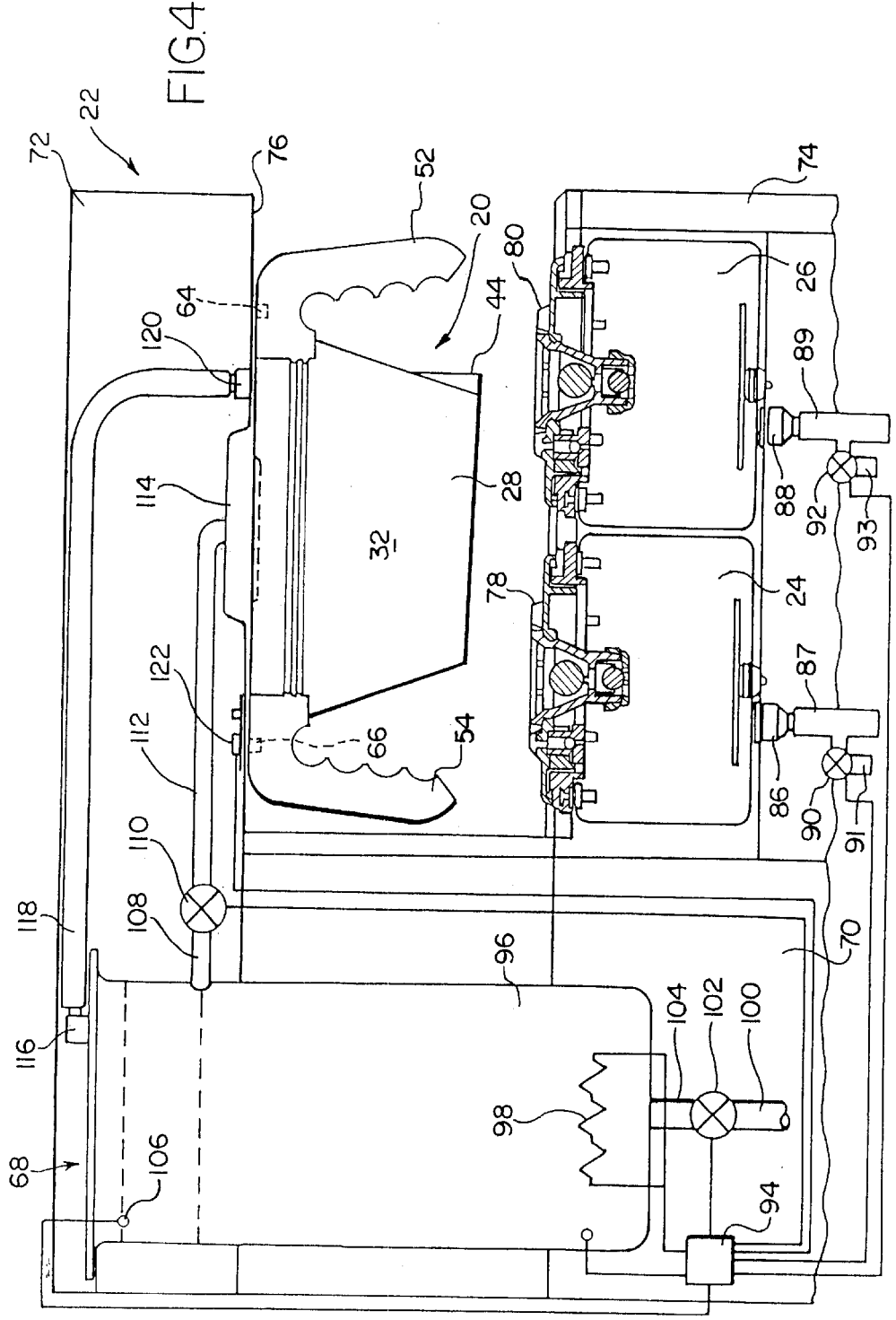
FIG. 4 is a cross-sectional view of the beverage making apparatus upon which the holder is mounted in a second direction, such holder being shown in side elevation.

Attention is now invited to FIGS. 3 and 4 which show the beverage making apparatus 22. The beverage making apparatus 22 includes a housing 68 which has a rear portion 70, a cantilevered portion 72 which extends outwardly from the rear portion 70, and a reservoir portion 74 which extends outwardly from the rear portion 70. The cantilevered portion 72 extends over the reservoir portion 74 and is spaced therefrom.

The cantilevered portion 72 includes a front wall, opposite side walls, a top wall and a bottom wall 76. A pair of elongated, spaced apart, parallel, horizontal rails (not shown) extend downwardly from the bottom wall 76 of the cantilevered portion 72. The rails are used to mount the holder 20 underneath the cantilevered portion 72, such that the holder 20 is between the cantilevered portion 72 and the reservoir portion 74.

The reservoir portion 74 includes the first reservoir 24 and the second reservoir 26 which are mounted side-by-side within the reservoir portion 74. As shown, the first reservoir 24 is proximate to the rear portion 70, and the second reservoir 26 is proximate to the front of the reservoir portion 74, such that the first reservoir 24 is between the second reservoir 26 and the rear portion 70. Each reservoir 24, 26 has a brew-through lid 78, 80 thereon, such as the one disclosed in U.S. Pat. Nos. 4,739,898 or 5,480,054.

An outlet 86, 88 is provided at the bottom end of each reservoir 24, 26 for dispensing beverage therefrom to a cup or carafe along line 87, 89. If the brewing apparatus 22 and holder 20 of the present invention are used to brew a concentrated beverage into the two reservoirs 24, 26, the concentrated beverage would flow through line 87, 89 to a peristaltic pump apparatus (not shown) which is disclosed in U.S. Pat. No. (Not Yet Assigned), which was filed on Jun. 23, 2000, entitled "Pump", which is commonly owned by the present assignee herein, and which disclosure is herein incorporated by reference. In such a concentrated beverage is brewed, the concentrated beverage is used with a dilution liquid, such as water, to produce the final beverage.

A pinch valve 90, 92 is attached to the line 87, 89 and outlet 86, 88 for controlling the release of beverage to a drain along line 91, 93. Each pinch valve 90, 92 is connected by suitable wiring to a controller 94 and each valve 90, 92 is controlled thereby.

A water reservoir 96 is associated with the housing 68 and may be mounted within the rear portion 70 as shown. The water reservoir 96 may be heated by use of a suitable electric heating element 98, such as a heater coil, to maintain the water therein hot. Pressurized water is supplied to the water reservoir 96 from a source (not shown) through a first conduit 100, through a fill valve 102, and through a second conduit 104, the second conduit 104 being connected to the water reservoir 96. The fill valve 102 is connected by suitable wiring to the controller 94 and the controller 94 regulates the amount of water supplied to the water reservoir 96 by operating the fill valve 102. A liquid detecting probe 106 is provided within the water reservoir 96 and is connected to the controller 94 by suitable wiring and is controlled thereby.

A first conduit 108 extends outwardly from an upper portion of the water reservoir 96 and is connected to a dispense valve 110 which is connected by suitable wiring to the controller 94 and is controlled thereby. A second conduit 112 is connected to the dispense valve 110. The first conduit 108, the dispense valve 110 and the second conduit 112 are provided in the cantilevered portion 72 of the housing 68. A spray head 114 of known construction is provided within the cantilevered portion 72 and is connected to the second conduit 112. The spray head 114 extends through the bottom wall 76 of the cantilevered portion 72 and has openings which direct water from the cantilevered portion 72 downwardly toward the reservoir portion 74. The rails on the cantilevered portion 72 are on opposite sides of the spray head 114 such that the rails do not interfere with the operation of the spray head 114.

An air vent fitting 116 extends upwardly from a top end of the water reservoir 96. A conduit 118 is connected to the air vent fitting 116 and extends to an air vent fitting 120 that is proximate to, but not in communication with, the spray head 114.

A sensor 122 is mounted within the bottom wall 76 of the cantilevered portion 72 and is coupled to the controller 94 by suitable wiring. As shown, the sensor 122 is mounted between the spray head 114 and the rear portion 70 of the housing 68. The sensor 122 is a Hall Effect sensor.

In use, the user decides whether the first reservoir 24 is to be used, which for example is to hold regular coffee or a first flavor of a beverage, or the second reservoir 26 is to be used, which for example is to hold decaffeinated coffee or a second flavor of a beverage.

If regular coffee or a first flavor of a beverage is to be made (into the first reservoir 24), see FIG. 3, the substance, such as ground coffee or other material, is placed into the holder 20. The user grips the second handle 54, which includes some form of indicia, for example the second handle 54 may be colored to indicate the type of beverage, may have "Regular" printed thereon or may have other indicia, and attaches the holder 20 to the cantilevered portion 72 by sliding the third and fourth portions 40, 42 of the flange 34 along the respective rails. When the holder 20 is fully attached to the cantilevered portion 72, the magnet 64 associated with the first handle 52 comes within the sensing range of the sensor 122 in the cantilevered portion 72 and the drain hole 50 is positioned over the opening in the lid 78 of the first reservoir 24. The sensor 122 detects the polarity of the magnet 64 in the first handle 52 and communicates this information or signal to the controller 94. The controller 94 is pre-configured or programmed to associate various signals from the sensor 122 with the corresponding holder conditions or characteristics to determine that regular coffee or the first flavor of beverage is to be made. Upon receiving an appropriate signal from the sensor 122, the controller 94 allows operation of the dispense valve 110 such that water flows from the water reservoir 96, through the first conduit 108, through the dispense valve 110, through the second conduit 112 and to the spray head 114 to be dispensed into the holder 20.

Once the holder 20 is fully inserted, the red "regular low" indicator light (not shown) provided on the cantilevered portion 72 will blink, indicating that the holder 20 will brew into the first reservoir 24. The brew cycle is initiated by pressing the regular start switch (not shown) on the cantilevered portion 72. If the decaffeinated start switch (not shown) is pressed instead of the regular start switch, the green "autobrew ready" indicator (not shown) will flash.

Once the correct start switch is pressed, water flows from the water reservoir 96, through the first conduit 108, through the open dispense valve 110, through the second conduit 112 and to the spray head 114 to be dispensed into the holder 20. A lock pin (not shown) also drops from the underside of the cantilevered portion 72, locking the holder 20 in place during the brew cycle. The water saturates and flows through the substance in the holder 20 or the material in the holder 20 is otherwise combined with the water, and the resulting beverage flows outwardly from the holder 20 through the drain hole 50. The beverage flows through the lid 78 and is held in the first reservoir 24 until dispensed on demand by the user or through a controllable valve. At the end of the cycle, the controller 94 operates the dispense valve 110 thereby closing the dispense valve 110 to terminate the flow of water to the spray head 114. After the dispense valve 110 is closed, the lock pin will continue to lock the holder 20 in place until a pre-programmed time has expired, to let the remaining fluid in the holder 20 dip out therefrom. After the lock pin retracts, red "dispose grounds" indicator light (not shown) on the cantilevered portion 72 illuminates, signaling that the used grounds are in the holder 20. The holder 20 can then be removed, and the used grounds can be disposed. The beverage in the reservoir 24 is kept at the desired temperature through the use of the system disclosed in U.S. Pat. No. 09/452,262, which was filed on Dec. 1, 1999, entitled "Heated Beverage Container", which is commonly owned by the present assignee herein, and which disclosure is herein incorporated by reference.

During this cycle, as the volume of water diminishes in the water reservoir 96, the liquid detecting probe 106 senses this condition and sends a signal to the controller 94. The controller 94 operates the fill valve 102 to open to allow pressurized water into the water reservoir 96 until the liquid detecting probe 106 senses that the water reservoir 96 is full (the water reservoir 96 fills to a point which is below the air vent fitting 116 opening in the water reservoir 96). Once the water reservoir is full, the controller 94 operates the fill valve 102 to close. This filling operation repeats itself as necessary during the cycle. Water does not flow through the air vent fitting 116 as the water level does not reach the top end of the water reservoir 96.

If decaffeinated coffee or a second flavor of a beverage is to be made (into the second reservoir 26), see FIG. 4, the substance, such as ground coffee or other material, is placed into the holder 20. The user then grips the first handle 52, which includes some form of indicia, for example the first handle 52 may be colored in a different color than the second handle 54 to indicate the type of beverage, may have "Decaffeinated" printed thereon or may have other indicia, and attaches the holder 20 to the cantilevered portion 72 by sliding the third and fourth portions 40, 42 of the flange 34 along the respective rails. When the holder 20 is fully attached, the magnet 66 in the second handle 54 comes within the sensing range of the sensor 122 and the drain hole 50 is positioned over the opening in the lid 80 of the second reservoir 26. The sensor 122 detects the polarity of the magnet 66 in the second handle 54 and communicates this information or signal to the controller 94. The controller 94 is pre-configured or programmed to the information or signal from the sensor 122 to determine that decaffeinated coffee or the second flavor of beverage is to be made. Upon receiving the signal from the sensor 122, the controller 94 allows operation of the dispense valve 110 such that water flows from the water reservoir 96, through the first conduit 108, through the dispense valve 110, through the second conduit 112 and to the spray head 114 to be dispensed into the holder 20.

Once the holder 20 is fully inserted, the red "decaf low" indicator light (not shown) provided on the cantilevered portion 72 will blink, indicating that the holder 20 will brew into the second reservoir 26. The brew cycle is initiated by pressing the decaf start switch (not shown) on the cantilevered portion 72. If the regular start switch (not shown) is pressed instead of the decaf start switch, the green "autobrew ready" indicator (not shown) will flash.

Once the correct start switch is pressed, water flows from the water reservoir 96, through the first conduit 108, through the open dispense valve 110, through the second conduit 112 and to the spray head 114 to be dispensed into the holder 20. The lock pin also drops from the underside of the cantilevered portion 72, locking the holder 20 in place during the brew cycle. The water saturates and flows through the substance in the holder 20 or the material in the holder 20 is otherwise combined with the water, and the resulting beverage flows outwardly from the holder 20 through the drain hole 50. The beverage flows through the lid 80 and is held in the second reservoir 26 until dispensed on demand by the user. At the end of the cycle, the controller 94 operates the dispense valve 110 thereby closing the dispense valve 110 to terminate the flow of water to the spray head 114. At the end of the cycle, the controller 94 operates the dispense valve 110 thereby closing the dispense valve 110 to terminate the flow of water to the spray head 114. After the dispense valve 110 is closed, the lock pin will continue to lock the holder 20 in place until a pre-programmed time has expired, to let the remaining fluid in the holder 20 dip out therefrom. After the lock pin retracts, red "dispose grounds" indicator light (not shown) on the cantilevered portion 72 illuminates, signaling that the used grounds are in the holder 20. The holder 20 can then be removed, and the used grounds can be disposed. The beverage in the reservoir 26 is kept at the desired temperature through the use of the system disclosed in U.S. Pat. No. 09/452,262, which disclosure has herein been incorporated by reference.

During this cycle, as the volume of water diminishes in the water reservoir 96, the liquid detecting probe 106 senses this condition and sends a signal to the controller 94. The controller 94 operates the fill valve 102 to open to allow pressurized water into the water reservoir 96 until the liquid detecting probe 106 senses that the water reservoir 96 is full (the water reservoir 96 fills to a point which is below the air vent fitting 116 opening in the water reservoir 96). Once the water reservoir 96 is full, the controller 94 operates the fill valve 102 to close. This filling operation repeats itself as necessary during the cycle. Water does not flow through the air vent fitting 116 as the water level does not reach the top end of the water reservoir 96.

it is to be understood that the specific position of the reservoirs 24, 26 as shown is illustrative only and multiple orientations can be used on the condition that the drain hole 50 in the holder 20 is positionable over a corresponding one of the lids 78, 80 when the holder 20 is mounted on the cantilevered portion 72.

It is within the scope of the invention that a single handle be provided on the holder 20 with the magnets 64, 66 be carried on the body 28. The flange would be modified to include several parallel sides so that the holder 20 could be mounted on the cantilevered portion 72 in a variety orientations by positioning the handle in different locations relative to the beverage making apparatus 22. It is within the scope of the invention that a removable handle may be provided on the holder 20 with the magnets 64, 66 carried on the body 28.

It is also to be understood that other structures can be used than magnets 64, 66 so long as they can be detected by a suitable sensor and can be differentiated from each other. For example, the first handle 52 could be colored red and the second handle 54 could be colored black. The sensor 122 could take the form of an optical sensor which is capable of differentiating whether the color red or the color black is detected so that the controller 94 can determine whether the first handle 52 or the second handle 54 is present. Another example would be to provide a single hole through the first handle 52 and a pair of holes through the second handle 54. The sensor 122 could take the form of an infrared sensors which determines whether one hole or two holes are present so that the controller 94 can determine whether the first handle 52 or the second handle 54 is present. Yet another example would be to provide a single protrusion extending upwardly from the first handle 52 and a pair of protrusions extending upwardly from the second handle 54. The sensor 122 could take the form of a pair of mechanical switches which are triggered by interaction with the protrusions. If one switch is triggered, the controller 94 would determine that the first handle 52 is present. If both switches are triggered, the controller 94 would determine that the second handle 54 is present.

While a preferred embodiment of the present invention is shown and described, it is envisioned that those skilled in the art may devise various modifications of the present invention without departing from the spirit and scope of the appended claims.

The invention claimed is:

1. An apparatus for use in making a beverage, comprising:

a holder comprising a body, first means provided on said body for providing an indication of a first orientation of said body, second means provided on said body for providing an indication of a second orientation of said body, said first means and said second means being spaced apart, generally opposite from each other on generally opposite sides of said body, and a drain hole provided through said body for allowing liquids to flow therethrough;

a housing on which said holder is capable of being mounted;

a sensor on said housing, said sensor being capable of sensing whether said first means or said second means is within its sensing range; and a controller, said sensor being coupled to said controller.

2. An apparatus as defined in claim 1, further including a first beverage reservoir and a second beverage reservoir, said first and second beverage reservoirs being positioned under where the holder is mounted on the housing, such that depending on the orientation of said holder as said holder is positioned on said housing, said drain hole being positioned over one of said first beverage reservoir and second beverage reservoir.

3. An apparatus as defined in claim 1, wherein said body of said holder has a bottom wall and a side wall, said drain hole being provided through said body at a position which is offset from a center of said bottom wall.

4. An apparatus as defined in claim 1, further comprising:

a first beverage reservoir and a second beverage reservoir;

said first and second beverage reservoirs being positioned under where said holder is mounted on said housing, a front portion;

a rear portion;

said first reservoir is proximate said rear portion and said second reservoir is proximate said front portion; and said holder being positionable to dispense a beverage from said holder through said drain hole to one of said first reservoir and said second reservoir over which said drain hole is position corresponding to the orientation of said first handle and said second handle.

5. An apparatus for use in making a beverage, comprising:

a holder comprising a body, a first magnet mounted on said body for providing an indication of a first orientation of said body, said first magnet having its north and south poles in said first orientation, a second magnet mounted on said body for providing an indication of a second orientation of said body, said second magnet having its north and south poles in said second orientation which is generally opposite to said first orientation, said first means and said second means being spaced apart from each other on said body, and a drain hole provided through said body for allowing liquids to flow therethrough;

a housing on which said holder is capable of being mounted;

a sensor on said housing, said sensor being capable of sensing whether said first magnet or said second magnet is within its sensing range; and a controller, said sensor being coupled to said controller.

6. An apparatus as defined in claim 5, wherein said first magnet has its north pole in an upward direction and its south pole in a downward direction and said second magnet has its north pole in a downward direction and its south pole in an upward direction.

7. An apparatus as defined in claim 5, wherein said sensor is a Hall Effect sensor.

8. An apparatus for use in making a beverage, comprising:

a holder comprising a body, a first handle attached to said body, a second handle attached to said body, said first handle and said second handle being offset from each other around said body, first means mounted on said first handle for providing an indication of a first orientation of said body when detected by an outside source, second means mounted on said second handle for providing an indication of a second orientation of said body when detected by the outside source, said first means and said second means being spaced apart from each other on said body, and a drain hole provided through said body for allowing liquids to flow therethrough;

a housing on which said holder is capable of being mounted;

a sensor on said housing, said sensor being capable of sensing whether said first means or said second means is within its sensing range; and a controller, said sensor being coupled to said controller.

9. An apparatus as defined in claim 8, wherein said first means comprises a first magnet mounted on said body, said first magnet having its north and south poles in a first orientation, and wherein said second means comprises a second magnet mounted on said body, said second magnet having its north and south poles in a second orientation which is generally opposite to said first orientation.

10. An apparatus as defined in claim 9, wherein said first magnet has its north pole in an upward direction and its south pole in a downward direction and said second magnet has its north pole in a downward direction and its south pole in an upward direction.

11. An apparatus as defined in claim 9, wherein said sensor is a Hall Effect sensor.

12. An apparatus as defined in claim 8, further including a first beverage reservoir and a second beverage reservoir, said first and second beverage reservoirs being positioned under where the holder is mounted on the housing, such that depending on the orientation of the holder as said holder is positioned on said housing, said drain hole being positioned over one of said first and second beverage reservoirs.

13. An apparatus as defined in claim 8, wherein said body of said holder has a bottom wall and a side wall, said drain hole being provided through said body at a position which is offset from a center of said bottom wall.

* * * * *